Dec. 10, 1935.   J. S. STULL   2,023,621
APPARATUS FOR COVERING CORES
Filed June 23, 1932   2 Sheets-Sheet 1
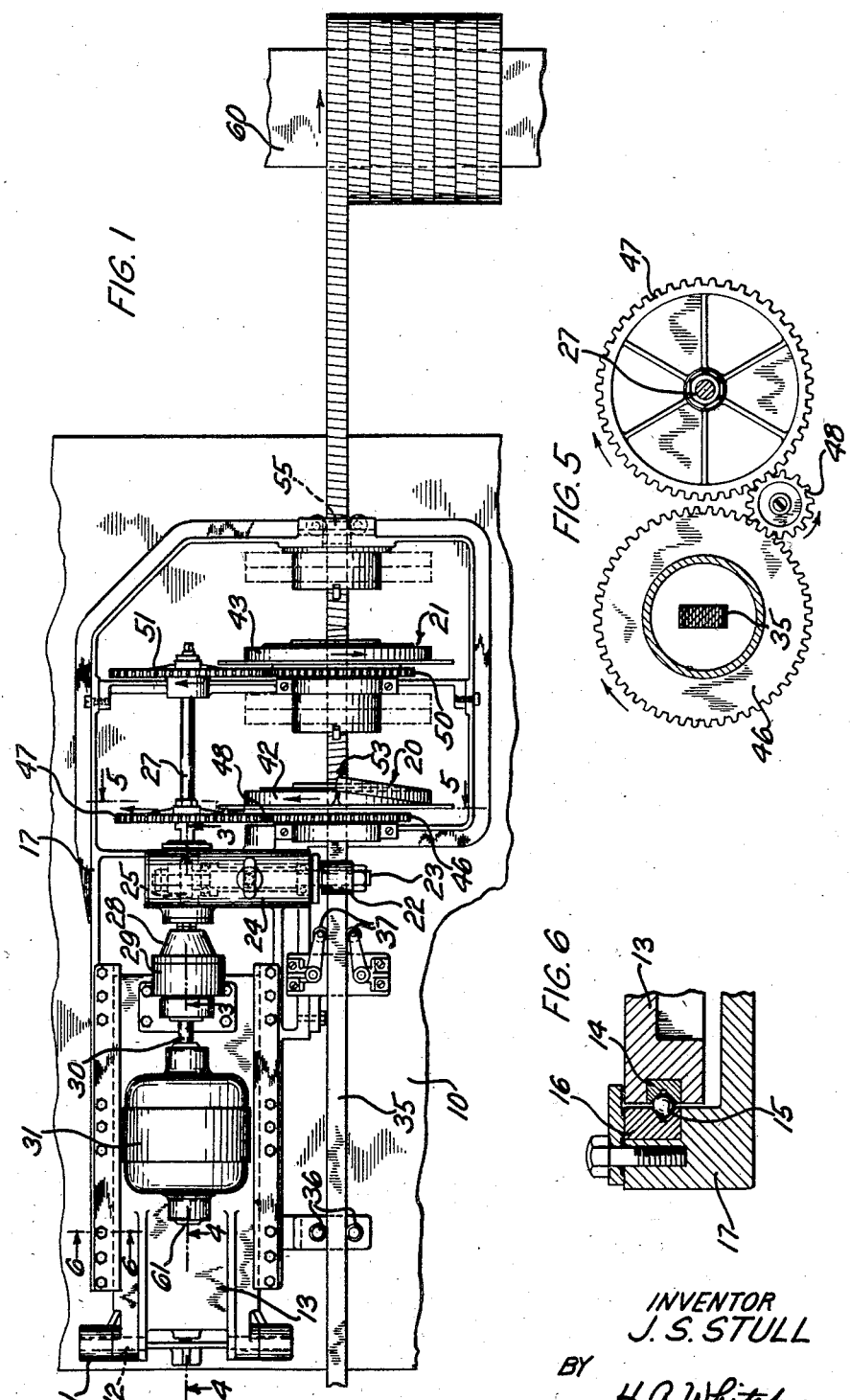
INVENTOR
J. S. STULL
BY
H. A. Whitehorn
ATTORNEY Dec. 10, 1935.  J. S. STULL  2,023,621
APPARATUS FOR COVERING CORES
Filed June 23, 1932  2 Sheets-Sheet 2
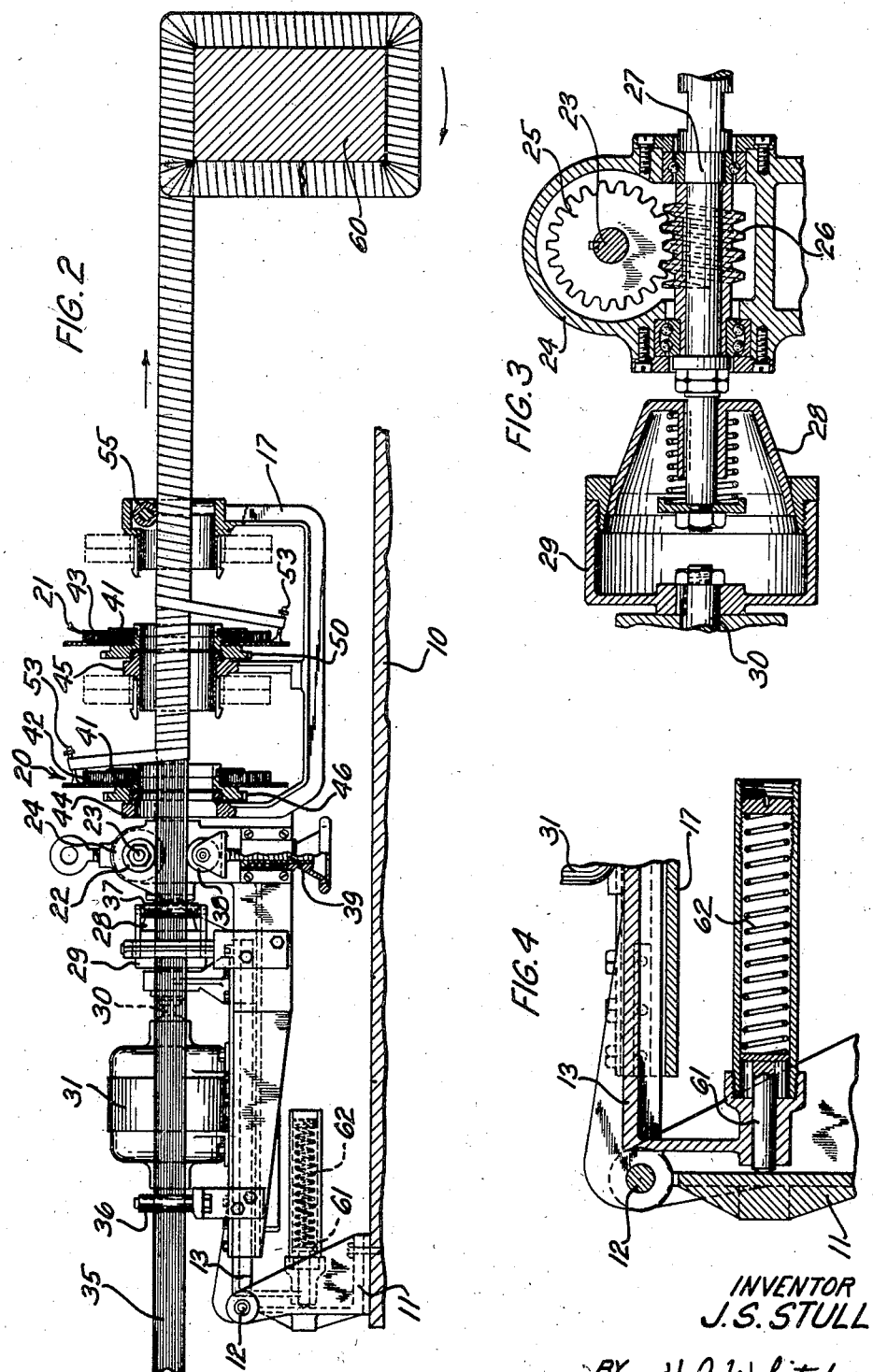
INVENTOR
J. S. STULL
BY H. A. Whitehorn
ATTORNEY Patented Dec. 10, 1935

2,023,621

UNITED STATES PATENT OFFICE 2,023,621

APPARATUS FOR COVERING CORES

John S. Stull, Chicago, Ill., assignor to Western Electric Company, Incorporated, New York, N. Y., a corporation of New York Application June 23, 1932, Serial No. 618,969

18 Claims. (Cl. 117—41)

This invention relates to an apparatus for covering a core and winding the covered core upon an arbor and more particularly to an apparatus for serving insulating material upon a core and winding the insulated core upon a non-circular arbor.

An object of the invention is to provide an efficient, practical, and expeditious apparatus for covering a core and winding the covered core upon an arbor.

One embodiment of the invention contemplates an apparatus for uniformly applying a covering material to a core while moving endwise at a varying rate, wherein a serving head is operated at a varying rate of speed and is movable longitudinally of the core to compensate for the varying rate of movement of the core. The operating speed and the longitudinal movement of the serving head are controlled by a friction wheel engaging the moving core with sufficient pressure to prevent slippage therebetween, the friction wheel being movable longitudinally of the core with the serving head and driven in synchronism therewith in the direction of the moving core through an irreversible drive, whereby a constant ratio is maintained between the operating speed of the serving head and the rate of relative movement between the core and the serving head irrespective of the varying rate of movement of the core.

Other objects and advantages will be apparent from the following detailed description taken in conjunction with the accompanying drawings, wherein Fig. 1 is a top plan view of the apparatus;

Fig. 2 is a side elevational view of the apparatus, portions thereof being shown in section;

Fig. 3 is a sectional view taken along the line 3—3 of Fig. 1;

Fig. 4 is an enlarged sectional view taken along the line 4—4 of Fig. 1;

Fig. 5 is a sectional view taken along the line 5—5 of Fig. 1; and

Fig. 6 is an enlarged sectional view taken along the line 6—6 of Fig. 1.

Referring now to the drawings wherein like reference numerals designate similar parts throughout the various views, numeral 10 designates a suitable stationary base having a bracket 11 fixed to one end thereof, to which is pivotally mounted, at 12, a table 13. The side edges of the table 13 are grooved to receive bearing members 14 (Fig. 6) in which ball members 15 are disposed in spaced positions and receivable in bearing members 16 of a movable carriage 17, the ball members 15 permitting longitudinal movement of the carriage relative to the table 13. The carriage 17 is in the form of a frame for supporting serving heads 20 and 21, together with a friction wheel 22.

The friction wheel 22 has its periphery serrated and is mounted upon a shaft 23, which is journaled in suitable bearings in a housing 24. Mounted upon the shaft 23 and positioned in the housing 24 is a worm gear 25 (Fig. 3), which interengages a worm 26 mounted upon a clutch shaft 27. The clutch shaft 27 extends to the left through the housing 24 and has mounted upon one end thereof a driven member 28 of a friction clutch, the driving member 29 of which is mounted upon a motor shaft 30 of a motor 31, which is mounted upon the table 13.

A core 35, which is to be served with an insulating material from the serving heads 20 and 21, passes between sets of guide rolls 36 and 37 and between the friction wheel 22 and an adjustable roller 38, the latter being carried by an adjusting screw 39, the purpose of which is to vary the frictional contact of the friction wheel with the core. The serving heads 20 and 21 are centrally apertured to accommodate the passing of the core 35 therethrough, and have drums 41 for receiving rolls of insulating material 42 and 43 and are rotatably carried by bearings 44 and 45. The serving head 20 has a gear 46 fixed thereto, which is operatively connected to a gear 47 through an idler gear 48. The gear 47 is mounted upon and keyed to the shaft 27. Fixed to the serving head 21 is a gear 50 which interengages a gear 51, the latter also being mounted upon and keyed to the shaft 27. In this manner the serving heads 20 and 21 are operatively connected to the power means, that is, the motor 31 when the friction clutch is engaged, thus rotating the serving heads 20 and 21 in counterclockwise and clockwise directions, respectively, looking from the left (Fig. 2).

The insulating material 42 of the serving head 20 is served to the core 35 prior to the serving of the insulating material 43 from the serving head 21. These materials extend from the rolls over guide pins 53, which extend transversely with respect to the serving heads so as to properly direct the insulating material to the core. The core after passing through the serving heads and being served with the insulating material passes beneath a roller 55 rotatably mounted in the free end of the carriage so that this end of the carriage may be moved substantially vertically by the core while it is being wound upon a noncircular arbor 60. In the present instance the arbor 60 is rectangular in cross-section and is connected to any suitable means (not shown) for imparting a rotary movement thereto.

During the substantial vertical movement of the carriage 17 with the table 13 about the pivot 12, a spring pressed plunger 61 (Figs. 2 and 4), which is carried by the table 13 and brought into engagement with the bracket 11 by means of a spring 62, tends to counterbalance the carriage and the table so as to relieve the insulated core of the greatest portion of the weight at the free end of the carriage.

To condition the apparatus for operation, the core 35 is guided between the sets of rolls 36 and 37, between the friction wheel 22 and the roller 38, through the apertures in the serving heads 20 and 21, beneath the roller 55 and fixed in any suitable manner to the arbor 60 so that it will be wound thereupon when the arbor is rotated. The insulating material 42 is then passed over the guide pin 53 of the serving head 20 and the end thereof wound around and fixed to the core in a suitable manner. The core is then advanced a predetermined distance, after which the insulating material 43 is passed beneath the guide pin 53 of the serving head 21 and the end thereof wrapped around and fixed to the core so that a second layer of material will be served to the core, the windings of which will be in one direction, while the windings of the first layer of material served by the serving head 20 will be in another direction.

The motor 31 is then started and the arbor 60 is rotated continuously at a constant rate of speed in a clockwise direction, viewing Fig. 2, the friction clutch being normally disengaged. During the continuous rotation of the arbor 60, an endwise or longitudinal movement will be imparted to the core 35, which movement will be at a cyclically varying rate due to the rectangular shape of the arbor. As soon as the apparatus begins operating and movement is imparted to the core 35, the gripping relation between the friction wheel 22 and the roller 38 with the core 35 will cause movement of the carriage to the right (Figs. 1 and 2), in view of the fact that the friction wheel is held against rotation in a counterclockwise direction, while the clutch is disengaged, by the interlocking of the worm gear 25 and the worm 26. Movement of the carriage a predetermined distance to the right will cause the driven member 28 of the friction clutch to move into frictional engagement with the driving member 29, which is continuously rotated by the motor and which is held against lateral movement in that the motor is mounted upon the table 13, together with a bracket which rotatably supports the driving member 29 of the clutch. The engagement of the clutch, that is, the moving of the driven member 28 into frictional engagement with the driving member 29, operatively connects the friction wheel 22 and the serving heads 20 and 21 to the motor, the friction wheel 22 being rotated in a counterclockwise direction by the rotation of the shaft 27, the worm 26, the worm gear 25, and the shaft 23. The rotation of the shaft 27 also causes a rotation of the serving head 20 in a counterclockwise direction and the serving head 21 in a clockwise direction, looking from the left (Fig. 2), which results in a counterclockwise winding of the insulating material 42 upon the core 35 and a winding of the insulating material 43 upon the first layer in a clockwise direction.

From the above described driving connections, it will be obvious that during the operation of the serving heads 20 and 21 a constant ratio is maintained between the rotating speed of the serving heads and the peripheral or surface speed of the core engaging wheel 22. The wheel 22 engages the core with sufficient pressure to prevent slippage therebetween and, therefore, since the drive to the wheel 22 is irreversible, the carriage 17 together with the serving heads and the driven clutch member 28 is moved forwardly by the core when the rate of movement of the core is faster than the surface speed of the wheel 22. Also, when the rate of movement of the core is slower than the surface speed of the wheel 22, the carriage together with the serving heads and the driven clutch member moves rearwardly due to the rolling engagement between the core and the wheel 22. Forward movement of the driven clutch member 28 causes its engagement with the driving clutch member 29 or increases the driving pressure therebetween, thereby increasing the speed of the serving heads and the wheel 22. Rearward movement of the driven clutch member causes its disengagement from the driving clutch member or decreases the driving pressure therebetween, which decreases the speed of the serving heads and the wheel 22. It will be apparent, therefore, that the core engaging wheel 22 serves as a regulating or controlling means whereby the core is permitted to move relative to the serving heads only when the serving heads are operating, and whereby a constant ratio is maintained between the operating speed of the serving heads and the rate of relative movement between the core and the serving heads irrespective of the varying rate of movement of the core. Thus, the two layers of insulating or covering material are uniformly applied to the core.

In the preferred construction, the maximum surface speed of the wheel 22 is slightly faster than the maximum rate of movement of the core. With this construction, the serving operation may be either continuous or intermittent depending upon the amount of variation in the rate of movement of the core, the speed at which such variation takes place, the construction of the friction clutch and the inertia of the moving parts. In either case, however, the serving is uniformly applied to the core.

The rotation of the arbor 60 at a constant rate of speed not only causes an irregular longitudinal movement of the core but causes a vertical movement thereof and the relative positions of the serving heads 20 and 21 with the conductor are maintained by the roller 55 lying upon the insulated core so as to lift the carriage with the table 13 about the pivot 12 aided by the plunger 61 and the spring 62.

Although the invention has been disclosed and described as applied to a particular apparatus, it is clear that it may have a more general application and that modifications may be made without departing from the spirit and scope of the appended claims.

What is claimed is:

1. In an apparatus for covering cores, means for advancing the core, a material serving member, and means for actuating said serving member intermittently during the advancement of the core, said actuating means including means for moving said serving member with the core when said serving member is idle.

2. In an apparatus for covering cores, means for advancing the core, a material serving member for serving material to the core while advancing, and means for actuating said serving member intermittently, said actuating means including an element engaging the core for causing movement of said serving member with the core when said serving member is idle.

3. In an apparatus for covering cores, means for advancing the core, a material serving member for serving material to the core while advancing, and means for actuating said serving member intermittently, said actuating means including an element engaging the core for causing movement of said serving member with the core when said serving member is idle, said element operating to alternately disconnect and connect said serving member and said actuating means.

4. In an apparatus for covering cores, means for advancing the core, a pair of serving members, means for actuating said serving members for moving them in opposite directions for serving layers of material to the core, and means engaging said core for effecting intermittent engagement of said serving members with said actuating means for causing intermittent operation of said serving members and for moving said serving members with the core while the serving members are idle.

5. In an apparatus for covering cores, means for winding the core upon a non-circular arbor, resulting in a transverse, as well as longitudinal, movement of the core, a serving member for serving material upon the core, means for actuating said serving member during the advancement of the core, and means for moving the serving head transversely with the core.

6. In an apparatus for covering cores, means for moving a core endwise at a varying rate, a member rotatable about the core for applying a covering material thereto, means for rotating said cover applying member at a substantially uniform rate, and means for moving said cover applying member longitudinally of the core at a varying rate to compensate for the varying rate of movement of the core, whereby the covering material is uniformly applied to the core.

7. In an apparatus for covering cores, means for longitudinally moving a core at a varying rate, means movable longitudinally of the core for applying a covering material to the moving core, means for operating said cover applying means at a variable speed, and means for varying the operating speed of the cover applying means and for moving said cover applying means longitudinally of the core to compensate for the varying rate of movement of the core, whereby the covering material is uniformly applied to the core.

8. In an apparatus for applying a covering material to a core while moving at a varying rate, a cover applying means reciprocable longitudinally of the core, means for operating said cover applying means to apply the covering material to the moving core, and means actuated simultaneously with said operating means for moving said cover applying means longitudinally of the core to compensate for the varying rate of movement of the core.

9. In an apparatus for applying a covering material to a core while moving at a varying rate, a cover applying means movable longitudinally of the core, and means responsive to variations in the rate of movement of the core for moving said cover applying means longitudinally of the core, whereby the covering material is uniformly applied to the core.

10. In an apparatus for covering cores, a cover applying means operable at a variable rate, means for causing a relative longitudinal movement between the core and the cover applying means at a varying rate, and means engaging the core and responsive to variations in the rate of said relative movement between the core and said cover applying means for correspondingly varying the operating speed of the cover applying means.

11. In an apparatus for covering cores, means for longitudinally moving a core at a varying rate, a longitudinally movable cover applying means, means for actuating said cover applying means, and means responsive to increases and decreases in the rate of movement of the core for respectively connecting and disconnecting said cover applying means and said actuating means, said responsive means operating to longitudinally move said cover applying means with the core when said cover applying means is idle.

12. In an apparatus for covering cores, means for longitudinally moving a core at a varying rate, a rotatable and longitudinally movable cover applying means, actuating means for rotating said cover applying means at a variable speed for applying a covering material to the core at a variable rate, and means engaging the moving core and responsive to increases and decreases in the rate of movement thereof for respectively connecting and disconnecting said cover applying means and said actuating means, said responsive means operating when said actuating means and said cover applying means are connected for maintaining a constant ratio between the operating speed of the cover applying means and the rate of relative movement between the moving core and the cover applying means, and said responsive means operating through the movement of the core to longitudinally move said cover applying means with the core when said cover applying means is idle.

13. In an apparatus for covering cores, means for moving a core longitudinally, a cover applying member, power means for actuating said cover applying member, and means controlled by the movement of the core for effecting an operative connection between said cover applying member and said power means to cause said cover applying member to uniformly apply a covering to the core.

14. In an apparatus for covering cores, means for winding a core upon a non-circular arbor resulting in a transverse as well as a longitudinal movement of the core, a serving member for serving material upon the core, a frame for supporting said serving member and movable transversely with the core for maintaining a relative position of the serving member with the core, and means for actuating said serving member during the advancement of the core.

15. In an apparatus for covering cores, means for winding a core upon a non-circular arbor resulting in a transverse as well as a longitudinal movement of the core, a serving member for serving material upon the core, a frame for supporting said serving member and movable transversely with the core for maintaining a relative position of the serving member with the core, power means for actuating said serving member, means controlled by the movement of the core for moving the frame with the core, and means affected by the movement of the frame with the core for operatively connecting said serving member with said power means.

16. In an apparatus for covering cores, means for moving a core longitudinally, a serving head rotatable about said core for serving material thereon, a friction wheel engaging said core, and gearing interconnecting said serving head and said friction wheel for maintaining a fixed ratio between the angular velocity of the serving head and the relative velocity of the core with respect to the serving head.

17. In an apparatus for covering cores, means for guiding a core longitudinally, a friction wheel frictionally engaging said core and being rotatable in a plane lengthwise of said core, a serving head rotatable about said core for serving material on said core at a fixed distance from said friction wheel, gearing interconnecting said friction wheel and said serving head whereby there is established a fixed relationship between the rate of rotation of the serving head and the rate of movement of the core relative to the serving head, and means for causing relative longitudinal motion between said core and said serving head and rotary motion of said serving head.

18. In an apparatus for covering cores, means for moving a core longitudinally, a friction wheel engaging said core and movable therewith, a serving head rotatable about said core for serving material upon said core, and means rendered effective by the movement of said friction wheel with said core for rotating said friction wheel and said serving head in synchronism, the friction wheel causing relative longitudinal movement between the serving head and the core when rotating.

JOHN S. STULL.